US012558941B2

(12) United States Patent
Hahn et al.

(10) Patent No.: US 12,558,941 B2
(45) Date of Patent: Feb. 24, 2026

(54) METHOD FOR OPERATING A TEMPERATURE-CONTROL DEVICE OF A MOTOR VEHICLE, AND TEMPERATURE-CONTROL DEVICE FOR A MOTOR VEHICLE

(71) Applicant: Bayerische Motoren Werke Aktiengesellschaft, Munich (DE)

(72) Inventors: Sebastian Hahn, Schwertberg (AT); Patrick Marinell, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 18/539,520

(22) Filed: Dec. 14, 2023

(65) Prior Publication Data

US 2024/0198764 A1     Jun. 20, 2024

(30) Foreign Application Priority Data

Dec. 15, 2022     (DE) ..................... 10 2022 133 377.9

(51) Int. Cl.
B60H 1/00          (2006.01)
B60H 1/32          (2006.01)

(52) U.S. Cl.
CPC ....... B60H 1/00899 (2013.01); B60H 1/0073 (2019.05); B60H 1/3205 (2013.01)

(58) Field of Classification Search
CPC . B60H 1/00899; B60H 1/0073; B60H 1/3205
See application file for complete search history.

(56) References Cited

U.S. PATENT DOCUMENTS

2003/0221435 A1    12/2003  Howard
2011/0108242 A1     5/2011  Eichberger et al.
2014/0041826 A1     2/2014  Takeuchi et al.

FOREIGN PATENT DOCUMENTS

CN        111577589 A  *  8/2020  .............. F25B 41/30
DE        603 20 060 T2    6/2009
EP        2 265 453 B1     8/2011
JP        5861495 B2       2/2016

OTHER PUBLICATIONS

CN_111577589 translation.*
German-language Office Action issued in German Application No. 10 2022 133 377.9 dated Oct. 11, 2023 (6 pages).

* cited by examiner

*Primary Examiner* — Elizabeth J Martin
(74) *Attorney, Agent, or Firm* — Crowell & Moring LLP

(57)          ABSTRACT

A method for operating a temperature-control device having a compressor line flowing a total mass flow of refrigerant and having a refrigerant compressor by which the refrigerant is conveyed and compressed, a condenser line branches off from the compressor line and flowing a first partial mass flow of the refrigerant, and having a first expansion valve to set and expand the first partial mass flow, and a condenser to condense the first partial mass flow arranged in the condenser line upstream of the first expansion valve. The refrigerant circuit includes a bypass line which is connected parallel to the condenser line and which branches off from the compressor line and through which a second partial mass flow of the refrigerant thus flows.

18 Claims, 6 Drawing Sheets

METHOD FOR OPERATING A TEMPERATURE-CONTROL DEVICE OF A MOTOR VEHICLE, AND TEMPERATURE-CONTROL DEVICE FOR A MOTOR VEHICLE

CROSS REFERENCE TO RELATED APPLICATION

This application claims priority under 35 U.S.C. § 119 from German Patent Application No. DE 10 2022 133 377.9, filed Dec. 15, 2022, the entire disclosure of which is herein expressly incorporated by reference.

BACKGROUND AND SUMMARY OF THE INVENTION

The invention relates to a method for operating a temperature-control device of a motor vehicle. The invention also relates to such a temperature-control device.

JP 5861 495 B2 discloses a temperature control device for a vehicle. Also known from EP 2 265 453 B1 is a cooling arrangement for cooling a temperature-sensitive unit of a motor vehicle. In addition, DE 603 20 060 T2 discloses a method for operating a transcritical cooling system.

It is an object of the present invention to provide a method for operating a temperature-control device of a motor vehicle and such a temperature-control device so that at least one subregion of the motor vehicle can be temperature-controlled, that is to say cooled and/or heated, in a particularly robust and cost-effective manner.

This object is achieved according to the invention by a method having the features disclosed herein and by a temperature-control device having the features disclosed herein. Advantageous embodiments of the invention are also disclosed herein.

A first aspect of the invention relates to a method for operating a temperature-control device for the temperature control, that is to say for cooling and/or heating, of at least one subregion of a motor vehicle. This means that the motor vehicle, also simply referred to as vehicle and preferably in the form of a car, in particular a passenger car, has, in its completely produced state, the temperature-control device by means of which at least the aforementioned subregion can be temperature-controlled, that is to say cooled and/or heated. For example, the subregion is or comprises an interior, also referred to as passenger cell or passenger compartment, of the motor vehicle, in the interior of which persons, such as, for example, the driver of the motor vehicle, can be situated during a journey of the motor vehicle. Alternatively or additionally, the subregion can comprise for example an electrical energy store of the motor vehicle. Preferably, the electrical energy store, in or by means of which electrical energy can be stored, in particular electrochemically, is a high-voltage component whose electrical voltage, in particular the electrical operating and nominal voltage, is preferably greater than 50 volts, in particular greater than 60 volts, and very preferably several hundred volts. The motor vehicle is thus for example a hybrid vehicle or else an electric vehicle, in particular a battery electric vehicle (BEV). The motor vehicle has for example at least one electric machine by means of which the motor vehicle can be driven electrically, in particular purely electrically. Preferably, the electric machine is a high-voltage component whose electrical voltage, in particular electrical operating and nominal voltage, is preferably greater than 50 volts, particularly preferably greater than 60 volts, and very preferably several hundred volts. For example, the electric machine can be supplied with the electrical energy stored in the electrical energy store, as a result of which the electric machine can be operated in a motor mode and thus as an electric motor by means of which the motor vehicle can be driven electrically, in particular purely electrically.

The temperature-control device has a refrigerant circuit, also simply referred to as a circuit or refrigerant loop, through which a refrigerant can flow and through which, in particular in the method, it flows. The refrigerant circuit has a compressor line which is also referred to as a compressor branch, which compressor line is also referred to as a first line or first branch. A total mass flow of the refrigerant flows through the compressor line. The refrigerant circuit also has a refrigerant compressor, also referred to as compressor, which is arranged in the compressor line. The refrigerant is conveyed and compressed by the refrigerant compressor. In particular, the total mass flow is conveyed and compressed by the refrigerant compressor.

The refrigerant circuit also has a condenser line which branches off from the compressor line, in particular at a first branch-off point, and through which a first partial mass flow thus flows. The first partial mass flow is a first part of the total mass flow, since the total mass flow is split into the first partial mass flow, in particular at the first branch-off point. In other words, the first partial mass flow is branched off from the total mass flow, in particular at the first branch-off point. In the condenser line there is arranged a first expansion valve by means of which the first partial mass flow can be set and is expanded. In other words, mutually different values of the first partial mass flow can be set by the first expansion valve, with the result that the first partial mass flow can be varied. Also arranged in the condenser line is a condenser by means of which the first partial mass flow is condensed, in particular in a targeted manner. In this way, the first partial mass flow is cooled.

The condenser is arranged upstream of the first expansion valve in the condenser line, in particular in the flow direction of the refrigerant flowing through the condenser line. In other words, the first expansion valve is arranged downstream of the condenser in the condenser line, in particular in the flow direction of the refrigerant flowing through the condenser line. In this way, a particularly effective and efficient operation of the temperature-control device, in particular of the refrigerant circuit, can be implemented.

The refrigerant circuit also has a bypass line which branches off from the compressor line and is thus fluidically connected parallel to the condenser line. In particular, the bypass line branches off from the compressor line at a second branch-off point. Since the bypass line branches off from the compressor line, a second partial mass flow, which is a second part of the total mass flow, flows through the bypass line. This means that the total mass flow is split into the second partial mass flow, in particular at the second branch-off point. Again in other words, the second partial mass flow is branched off from the total mass flow, in particular at the second branch-off point. The branch-off points can coincide and thus be formed by a single overall branch-off point or be situated at a single overall branch-off point, or else the branch-off points are spaced apart from one another, in particular in the flow direction of the refrigerant flowing through the refrigerant circuit. The total mass flow thus splits into the first partial mass flow and into the second partial mass flow. Again in other words, the total mass flow is split or divided into the first partial mass flow and into the second partial mass flow, wherein the first partial mass flow and the second partial mass flow preferably in total give the total mass flow. Since the total mass flow is split or divided into the partial mass flows, the first partial mass flow is less than the total mass flow, and the second partial mass flow is less than the total mass flow. The second partial mass flow flows through the bypass line, in which a second expansion valve is arranged. The second partial mass flow can be set by the second expansion valve. This means that mutually different values of the second partial mass flow can be set by the second expansion valve, as a result of which the second partial mass flow is variable, that is to say changeable. In addition, the second partial mass flow is expanded by the second expansion valve. The respective partial mass flow can be set by the respective expansion valve in particular in that a flow cross section, through which the respective partial mass flow can flow, of the respective expansion valve can be set, that is to say that mutually different values of the respective flow cross section can be set.

The first partial mass flow can flow through or flows through the first expansion valve, and the second partial mass flow can flow through or flows through the second expansion valve. The total mass flow can flow through or flows through the refrigerant compressor. In addition, the second partial mass flow can flow through or flows through the condenser. The condenser is a heat exchanger which can be or is operated as said condenser for example at least in one mode, at least in a heating pump mode, of the temperature-control device. For example, a fluid provided in addition to the refrigerant can flow through and/or around the condenser. For example, heat can pass from the refrigerant to the fluid via the condenser, as a result of which, in particular in said mode, the refrigerant is cooled and the fluid is heated. Heat contained in the refrigerant can thus be used to heat the fluid. The fluid can be fed for example to the subregion in order thereby to heat and thus temperature-control the subregion by the fluid, in particular by the heat which has passed from the refrigerant to the fluid via the condenser. Expressed more generally, for example the subregion can be temperature-controlled, in particular heated, by the fluid, in particular by the heat contained in the fluid and passed from the refrigerant to the fluid via the condenser. For example, the fluid is a gas, in particular air, which is introduced for example into the subregion, in particular into the aforementioned interior, in order thereby to temperature-control, in particular heat, the interior by the fluid. It is also conceivable that the fluid is a liquid. For example, the electrical energy store can be temperature-controlled, in particular heated, by the fluid. For this purpose, for example, the electrical energy store is supplied with the fluid. In particular the aforementioned mode is for example a heating pump mode.

The heat which has passed from the refrigerant to the fluid via the condenser can for example pass from the fluid to the electrical energy store in order thereby to heat and thus temperature-control the electrical energy store. Said heat, which can be or is transferred from the refrigerant to the fluid via the condenser, originates for example at least predominantly or else exclusively from the refrigerant compressor or is it at least brought about predominantly or exclusively by the refrigerant compressor or fed into the refrigerant, in particular in that the refrigerant is compressed and thus heated by the refrigerant compressor. The refrigerant compressor can thus be used as a heat source to heat the refrigerant, in particular to heat for example the fluid via the condenser and consequently to heat the subregion.

The refrigerant circuit has at least a third expansion valve which is arranged upstream of the condenser in the condenser line, in particular in the flow direction of the refrigerant flowing through the condenser line, and by means of which the first partial mass flow can be set and is expanded. Thus, the condenser is arranged downstream of the third expansion valve in the condenser line, in particular in the flow direction of the refrigerant flowing through the condenser line. In other words, the mutually different values of the first partial mass flow can be set by the third expansion valve, with the result that the first partial mass flow can be varied. This means that the first partial mass flow can be set by the first expansion valve and/or by the third expansion valve, that is to say that the mutually different values of the first partial mass flow can be set by the first expansion valve and/or by the third expansion valve, in particular to vary the first partial mass flow.

The first partial mass flow can be set by the third expansion valve in particular in that a flow cross section, through which the first partial mass flow can flow or flows, of the third expansion valve can be set, that is to say mutually different values of the flow cross section of the third expansion valve can be set.

The first partial mass flow can flow or flows through the third expansion valve. In particular, a pressure of the refrigerant flowing through the condenser line can be set, in particular in a targeted manner, by the third expansion valve.

Furthermore, there is provision that the bypass line and the condenser line are brought together at a mixing point, in particular precisely one mixing point, and are thus fluidically connected. The partial mass flows are brought together at the mixing point and thus mixed with one another, as a result of which the, in particular mixed, partial mass flows give, in particular in total, the total mass flow which flows, in particular at the mixing point, into the compressor line and subsequently flows through the compressor line and thereby in particular through the refrigerant compressor.

In the method, a first pressure and a first temperature of the refrigerant, in particular of the total mass flow, in the condenser line upstream of the refrigerant compressor and downstream of the mixing point are determined by an electronic computing device, in particular of the temperature-control device, very particularly of the motor vehicle. The first pressure of the refrigerant, in particular of the total mass flow, is to be understood as a pressure of the refrigerant, in particular of the total mass flow, wherein the first pressure prevails at a first pressure point which is arranged in the compressor line upstream of the refrigerant compressor and downstream of the mixing point. The first temperature of the refrigerant, in particular of the total mass flow is to be understood as a temperature of the refrigerant, in particular of the total mass flow, wherein the first temperature prevails at a first temperature point which is arranged in the compressor line upstream of the refrigerant compressor and downstream of the mixing point. For example, the first pressure point and the first temperature point coincide.

A second pressure and a second temperature of the refrigerant, in particular in the compressor line, downstream of the refrigerant compressor, upstream of the condenser and upstream of the first and the second expansion valve, and in particular upstream of the third expansion valve, are determined by the electronic computing device. The second pressure of the refrigerant is to be understood as a pressure of the refrigerant, wherein the second pressure prevails at a second pressure point which is arranged downstream of the refrigerant compressor and upstream of the condenser and upstream of the first and the second expansion valve, and in particular upstream of the third expansion valve, wherein the second pressure point is arranged for example in the compressor line or in the bypass line or in the condenser line.

The second temperature of the refrigerant is to be understood as a temperature of the refrigerant, wherein the second temperature prevails at a second temperature point which is arranged downstream of the refrigerant compressor, upstream of the condenser and upstream of the first and the second expansion valve, and in particular upstream of the third expansion valve, wherein the second temperature point is arranged in the compressor line, in the bypass line or in the condenser line. In particular, it is conceivable that the second pressure point and the second temperature point coincide.

A third pressure and a third temperature of the refrigerant, in particular of the first partial mass flow, in the condenser line downstream of the condenser and upstream of the first expansion valve are determined by the electronic computing device. The third pressure of the refrigerant, in particular of the first partial mass flow, is to be understood as a pressure of the refrigerant, in particular of the first partial mass flow, wherein the third pressure prevails at a third pressure point which is arranged in the condenser line downstream of the condenser and upstream of the first expansion valve. The third temperature of the refrigerant, in particular of the first partial mass flow, is to be understood as a temperature of the refrigerant, in particular of the first partial mass flow, wherein the third temperature prevails at a third temperature point which is arranged in the condenser line downstream of the condenser and upstream of the first expansion valve. The third pressure point and the third temperature point can coincide. The pressures and the temperatures are determined by the electronic computing device, which will be explained in more detail below.

In the method, the first and the second expansion valve, and in particular the third expansion valve, are actuated by the electronic computing device in dependence on the determined temperatures and in dependence on the determined pressures, as a result of which the partial mass flows are set in dependence on the determined temperatures and in dependence on the determined pressures. This means that the partial mass flows are set, that is to say in particular are varied, in dependence on the determined pressures and in dependence on the determined temperatures by the electronic computing device via the first and the second expansion valve, and in particular via the third expansion valve, that is to say by actuating the first and the second expansion valve, and in particular by actuating the third expansion valve, for example in that the aforementioned flow cross sections are set, that is to say in particular are varied, by actuating the first and the second expansion valve, and in particular by actuating the third expansion valve. This makes it possible in a particularly advantageous manner to set a ratio, also referred to as mixing ratio, between the partial mass flows, in particular of the first partial mass flow to the second partial mass flow, with the result that a robust operation of the temperature-control device and consequently an effective and efficient temperature control can be implemented. In particular, the setting of the partial mass flows and thus the setting of the mixing ratio can avoid a situation in which the refrigerant compressor is supplied with wet steam or even with liquid. In other words, it is possible for example to avoid a situation in which the total mass flow resulting from the mixing of the partial mass flows comprises wet steam or even liquid, with the result that unwanted damage to the temperature-control device can be avoided. Furthermore, the invention makes it possible to realize particularly advantageous temperature control of the subregion without an electrical flow heater being arranged in the refrigerant circuit or in an additional temperature-control circuit provided for the temperature control of the subregion and through which, for example, the fluid can flow. Furthermore, it is possible to dispense with a heat exchanger, also referred to as a chiller and operable or operated for example as an evaporator, which is arranged in the refrigerant circuit and for example in the temperature-control circuit, with the result that the number of parts and thus the weight and the costs of the temperature-control device can be kept particularly small. At the same time, the invention makes it possible to advantageously set the partial mass flows and thus the mixing ratio in such a way that the total mass flow has a particularly advantageous state, in particular a state of aggregation, in particular in such a way that for example the enthalpy of the total mass flow lies to the right next to the dew line of the refrigerant, for example in the form of R1234yf, in particular in a phase diagram of the dew agent, wherein for example the in particular specific enthalpy is plotted on the abscissa of the phase diagram, and wherein the pressure of the refrigerant is plotted, in particular logarithmically, on the ordinate of the phase diagram.

In the method, furthermore, the third expansion valve is actuated by the electronic computing device in dependence on the determined third pressure, and in particular in dependence on the determined third temperature, in particular to adapt the determined third pressure to a predetermined, in particular predefined, setpoint value of the third pressure. Thus, the setting of the third expansion valve can regulate a pressure of the refrigerant flowing through the condenser line, in particular the third pressure, in dependence on the determined third pressure, and in particular in dependence on the setpoint value. This can be understood in particular as follows: for example a value, also referred to as a measurement value, of the third pressure is determined or measured, in particular by a sensor device. For example, the determined measurement value of the third pressure is compared with the setpoint value of the third pressure by the electronic computing device. This means that for example a deviation between the measurement value of the third pressure and the setpoint value of the third pressure is determined, in particular calculated, by the electronic computing device. The measurement value can be referred to in particular as an actual value. For example, by actuating the third expansion valve, the third pressure is set to a second value which is different from the measurement value and which preferably corresponds to the setpoint value. Thus, the second value or the setpoint value of the third pressure can in fact be set, in particular in a targeted manner, by the third expansion valve in dependence on the determined measurement value of the third pressure and in dependence on the setpoint value of the third pressure.

With respect to the first and the second expansion valve, the third expansion valve can be understood to be in particular an additional expansion valve. The third expansion valve allows the temperature-control device to be operated in a particularly flexible manner. This means that a flexibility of the temperature-control device can be particularly increased. As a result, at least the subregion of the motor vehicle can be temperature-controlled, in particular cooled and/or heated, in a particularly flexible manner. In particular, the third expansion valve allows a number of degrees of freedom of the temperature-control device, in particular of the refrigerant circuit, to be particularly increased. Thus, the third expansion valve makes it possible for the temperature-control device to be expanded by an additional degree of freedom for example with respect to the first and the second expansion valve. As a result, the temperature-control device can be operated particularly according to requirements, as a result of which at least the subregion of the motor vehicle can be temperature-controlled particularly according to requirements.

For example, the pressure of the refrigerant flowing through the condenser line can be reduced by the third expansion valve, that is to say that the pressure of the refrigerant flowing through the refrigerant circuit, in particular the condenser line, can be set by the third expansion valve in such a way that this pressure is lower downstream of the third expansion valve than upstream of the third expansion valve. In particular with a fixed setpoint pressure, it is thus possible, at the condenser, to build up a higher or particularly high pressure downstream of the refrigerant compressor, as a result of which more power or a particularly large amount of power and thus heating power can be introduced into the system or into the temperature-control device. As a result, a pressure level and/or temperature level at the condenser can be decoupled from a compressor power of the refrigerant compressor, as a result of which in particular the additional degree of freedom can be created. In particular, more heating power or a particularly large amount of heating power with a relatively small or particularly small temperature level can be brought about by the third expansion valve. By virtue of the fact that the temperature level and/or the pressure level are decoupled from the heating power and thus from the compressor power, it is possible for example for heating to be carried out at different temperature levels for the same or uniform compressor power. As a result, at least the subregion of the motor vehicle can be temperature-controlled, in particular cooled and/or heated, particularly advantageously, in particular in a particularly flexible manner or particularly according to requirements.

In order to be able to realize a particularly robust operation of the temperature-control device and avoid damage to the temperature-control device, in particular to the refrigerant compressor, in one embodiment of the invention there is provision that the partial mass flows and thus the mixing ratio are set by actuating the expansion valves, in particular by actuating the first, second and third expansion valve, in such a way that the total mass flow exclusively comprises superheated steam.

A further embodiment is distinguished by the fact that a first enthalpy of the refrigerant is calculated from the first pressure and the first temperature by the electronic computing device. For example, a second enthalpy of the refrigerant is calculated from the second pressure and the second temperature by the electronic computing device. For example, a third enthalpy of the refrigerant is calculated from the third pressure and the third temperature by the electronic computing device. It has been shown to be particularly advantageous here if the expansion valves, in particular the first, second and third expansion valve, are actuated in dependence on the calculated enthalpies, as a result of which the partial mass flows and thus also the mixing ratio are set in dependence on the calculated enthalpies. As a result, it can be ensured in a particularly advantageous manner that the enthalpy of the refrigerant in the compressor line upstream of the refrigerant compressor, that is to say in particular the first enthalpy, lies to the right next to the dew line in the phase diagram and is at a sufficiently large distance, in particular safety distance, from the dew line, as a result of which a robust and damage-free operation of the temperature-control device can be implemented.

A further embodiment is distinguished by the fact that the partial mass flows are set by actuating the expansion valves, in particular by actuating the first, second and third expansion valve, in such a way that the mixing ratio of the second partial mass flow to the first partial mass flow, and therefore a quotient of the second partial mass flow and the first partial mass flow, wherein the quotient has the second partial mass flow in its numerator and the quotient has the first partial mass flow in its denominator, is greater than a ratio of a first enthalpy difference to a second enthalpy difference, and therefore is greater than a second quotient, wherein the second quotient has the first enthalpy difference in its second numerator and wherein the second quotient has the second enthalpy difference in its second denominator. Here, the first enthalpy difference is the absolute magnitude of a first difference between the enthalpy of the temperature-control agent in the condenser line downstream of the condenser and upstream of the first expansion valve and the enthalpy of the refrigerant belonging to the first pressure and lying on the dew line of the refrigerant.

Furthermore here, the second enthalpy difference is the absolute magnitude of a second difference between the enthalpy of the temperature-control agent downstream of the refrigerant compressor, upstream of the condenser and upstream of the first and the second expansion valve, and in particular upstream of the third expansion valve, and the enthalpy of the refrigerant belonging to the first pressure and lying on the dew line (22) of the refrigerant. As a result the mixing ratio can be reliably set in such a way that, from the mixing ratio, and therefore from the mixing of the partial flows, such a state of the total mass flow results that the total mass flow is, in particular exclusively, superheated steam, and therefore that the enthalpy of the total mass flow belonging in particular to the first pressure lies to the right of the dew line in the phase diagram. This makes it possible to avoid damage to the refrigerant compressor such that the subregion can be temperature-controlled particularly advantageously, in particular in a particularly advantageous manner in terms of installation space, weight and cost while avoiding targeted evaporation of the refrigerant by an evaporator, and robustly.

In order to realize temperature control of the subregion that is particularly advantageous in terms of weight, cost and installation space, there is provision in a further embodiment of the invention that the bypass line is free from a condenser for the targeted condensing of the refrigerant. Alternatively or additionally, there is provision that the bypass line is free from an evaporator for the, in particular targeted, evaporation of the refrigerant. Alternatively or additionally, there is provision that the bypass line is free from a heat exchanger for the, in particular targeted, temperature control of the refrigerant.

In order to be able to temperature-control the subregion in a particularly advantageous manner in terms of installation space, weight and cost, there is provision in a further embodiment that the condenser is free from an evaporator for the, in particular targeted, evaporation of the refrigerant. Alternatively or additionally, the condenser line is, for example, apart from the condenser, free from a heat exchanger for the, in particular targeted temperature control, that is to say cooling or heating, of the refrigerant. In this way, the number of parts and also the costs, the installation space requirement and the weight of the temperature-control device can be kept particularly small. The method according to the invention makes it possible to set a particularly advantageous state, in particular state of aggregation, of the total mass flow, resulting from the mixing of the partial mass flows, without the refrigerant being evaporated in a targeted manner by an evaporator in the refrigerant circuit, since it can be ensured for example, by the described setting of the partial mass flows and thus of the mixing ratio, that the total mass flow is superheated steam, that is to say that the enthalpy of the total mass flow in the compressor line upstream of the refrigerant compressor lies to the right next to the dew line in the phase diagram, in particular at the first pressure.

A further embodiment is distinguished by the fact that, in particular targeted, evaporation of the refrigerant by an evaporator is dispensed with in the condenser line. This embodiment is based on the idea that it is conceivable in principle that an evaporator could be arranged in principle in particular in the condenser line, in particular downstream of the condenser and for example downstream of the first expansion valve and in particular upstream of the mixing point, which evaporator is designed for targeted evaporation of the refrigerant, with it being the case, however, that to realize particularly efficient and effective temperature control, there is provision that targeted evaporation of the temperature-control agent by the evaporator is dispensed with.

To keep the number of parts and thus the weight, the installation space requirement and the costs of the temperature-control device particularly small, there is provision in a further embodiment that the compressor line is free from a condenser for the, in particular targeted, condensing of the refrigerant. Alternatively or additionally, the compressor line is free from an evaporator for the, in particular targeted, evaporation of the refrigerant. Alternatively or additionally, the compressor line is free from a heat exchanger for the, in particular targeted, temperature control of the refrigerant.

In order to be able to determine the pressures and the temperatures particularly precisely and consequently set the partial mass flows particularly precisely, there is provision in a further embodiment of the invention that the first pressure and the first temperature are measured by a first sensor device and thus determined. Alternatively or additionally, the second pressure and the second temperature are measured by a second sensor device and thus determined. Alternatively or additionally, the third pressure and the third temperature are measured by a third sensor device and thus determined. For example, the first pressure is measured at the first pressure point by the first sensor device. Furthermore, it is conceivable that the first temperature is measured at the first temperature point by the first sensor device. For example, the second pressure is measured at the second pressure point by the second sensor device. For example, the second temperature is measured at the second temperature point by the second sensor device. For example, the third pressure is measured at the third pressure point by the third sensor device. For example, the third temperature is measured at the third temperature point by the third sensor device.

In order to be able to keep the number of parts and thus the costs, the weight and the installation space requirement of the temperature-control device within a particularly small range, there is provision in a further embodiment of the invention that the first pressure and the first temperature are calculated by the electronic computing device on the basis of a computing model and thus determined. Alternatively or additionally, the second pressure and the second temperature are calculated by the electronic computing device on the basis of a computing model and thus determined. Alternatively or additionally, the third pressure and the third temperature are calculated by the electronic computing device on the basis of a computing model and thus determined.

The first sensor device provides for example an, in particular electrical, first signal which characterizes the first pressure and the first temperature. The electronic computing device receives the first signal and thus determines for example the first pressure and the first temperature. Furthermore, it is conceivable that the second sensor device provides a second, in particular electrical, signal which characterizes the second temperature and the second pressure. The electronic computing device receives for example the second signal and thus determines the second pressure and the second temperature. For example, the third sensor device provides a third, in particular electrical, signal which characterizes the third temperature and the third pressure. The electronic computing device receives for example the third signal and thus determines the third pressure and the third temperature.

Finally, it has been shown to be particularly advantageous if, in a first operating state, the first partial mass flow is set to a first value and the second partial mass flow is set to a second value by actuating the expansion valves, in particular by actuating the first, second and third expansion valve, with the result that, in the first operating state or during the first operating state, the first partial mass flow has the first value and the second partial mass flow has the second value. In a second operating state, the first partial mass flow is set to a third value, which is different from the first value, and the second partial mass flow is set to a fourth value, which is different from the second value, by actuating the expansion valves, in particular by actuating the first, second and third expansion valve, with the result that, in the second operating state or during the second operating state, the first partial mass flow has the third value and the second partial mass flow has the fourth value. There is preferably provision here that a first ratio, also referred to as a first value ratio, of the first value to the second value corresponds to a second ratio, also referred to as a second value ratio, of the third value to the fourth value. In other words, for example a first value quotient corresponds to a second value quotient, wherein the first value quotient has the first value in its first value quotient numerator, wherein the first value quotient has the second value in its first value quotient denominator, wherein the second value quotient has the third value in its second value quotient numerator, and wherein the second value quotient has the fourth value in its second value quotient denominator. As a result, a first power of the refrigerant compressor is set in the first operating state, and a second power of the refrigerant compressor, which is different from the first power, is set in the second operating state. In other words, the mixing ratio in the first operating state corresponds to the mixing ratio in the second operating state, with the result that a robust operation of the temperature-control device can be realized without damage both in the first operating state and in the second operating state. In other words, it can be ensured both in the first operating state and in the second operating state that the enthalpy of the total mass flow in the compressor line upstream of the refrigerant compressor lies to the right of the dew line in the phase diagram. Since, however, the first partial mass flow and the second partial mass flow have different values in the operating states, different powers of the refrigerant compressor are set, with the result that, for example, the fluid is temperature-controlled, in particular heated, to different degrees by the refrigerant compressor. If, for example, the power of the refrigerant compressor is greater in the second operating state than in the first operating state, the refrigerant is for example heated more strongly by the refrigerant compressor in the second operating state than in the first operating state. Thus, for example, the subregion can be more strongly heated by the refrigerant and in particular by the refrigerant compressor in the second operating state, in particular via the fluid, than in the first operating state, wherein an unfavorable state of aggregation of the total mass flow in the compressor line upstream of the refrigerant compressor can be avoided in both operating states. This embodiment thus allows a robust and reliable setting according to requirements, that is to say variation of the power of the refrigerant compressor and thus a power, for example in the form of heating power, for temperature control of the subregion.

Preferably, the refrigerant compressor takes the form of an electrical refrigerant compressor, with the result that the power of the refrigerant compressor is an electrical power of the refrigerant compressor.

A second aspect of the invention relates to a temperature-control device for a motor vehicle, wherein the temperature-control device according to the second aspect of the invention is designed to carry out a method according to the first aspect of the invention. Advantages and advantageous embodiments of the first aspect of the invention can be considered as advantages and advantageous embodiments of the second aspect of the invention, and vice versa.

Also disclosed is a motor vehicle, also referred to simply as a vehicle, which preferably takes the form of a car, in particular a passenger car, and has the temperature-control device according to the invention. Advantages and advantageous embodiments of the first aspect and of the second aspect of the invention can be considered as advantages and advantageous embodiments of the motor vehicle, and vice versa.

The invention is based in particular on the following findings and considerations: the invention makes it possible to realize a new temperature-control concept, in particular heating concept, for temperature control, in particular heating, of the aforementioned subregion, in particular of the interior and/or of the electrical energy store formed in particular as a high-voltage store, specifically for example using the refrigerant compressor as a single heat source arranged in the described refrigerant circuit. Tests have shown that this heating concept is not to be stabilized with the aid of a simple PI controller approach. The stabilization of two connected triangulation processes has been identified as a core problem. Since, for example, the condenser line is free from an evaporator for the targeted evaporation of the refrigerant or since, in particular at least while the method is carried out, targeted evaporation of the refrigerant by an evaporator is dispensed with in the condenser line, for example a first thermodynamic cyclic process, which takes the form of a first triangulation process, proceeds via the condenser line. Since the refrigerant flowing through the bypass line bypasses the condenser line on its way from the compressor line through the bypass line back to the compressor line and since for example, in particular also, no evaporator for evaporating the refrigerant is arranged in the bypass line, or, in particular while the method is carried out, targeted evaporation of the refrigerant is dispensed with in the bypass line, for example a second thermodynamic cyclic process, which takes the form of a second triangulation process, proceeds via the compressor line and the bypass line. The triangulation processes are fluidically connected parallel to one another, wherein mixing of the refrigerant, and therefore mixing of the partial mass flows, occurs as a result of this parallel connection, wherein the partial mass flows have different thermodynamic states, in particular when they arrive at the mixing point and are mixed with one another at the mixing point. What is to be understood in particular by this is that the first partial mass flow has a first thermodynamic state and the second partial mass flow has a second thermodynamic state which is different from the first thermodynamic state. What is to be understood by the aforementioned stabilization is that it is desirable, during the stabilization or as a result of the stabilization, to set the total mass flow, in particular a thermodynamic state of the total mass flow, by mixing the partial mass flows in such a way that the total mass flow is at least predominantly, in particular exclusively, heated steam, that is to say that the enthalpy of the total mass flow lies to the right next to the dew line in the phase diagram. Since the partial mass flows are mixed at the mixing point, the total mass flow is an end product of the described mixture of the total mass flows. If the end product (total mass flow) comes to lie in an unfavorable fluid state or in an unfavorable thermodynamic state, damage may occur to the refrigerant compressor, also referred to as a compressor, which can lead to irreparable damage to the overall refrigerant circuit. Consequently, the refrigerant circuit has to be replaced, which can be costly. Moreover, a power setting of the temperature-control device has proved to be problematic since, in the heating concept, the refrigerant compressor is or can be the only power provider arranged in the refrigerant circuit, and therefore the only heat source arranged in the refrigerant circuit, by means of which the refrigerant and, for example via the refrigerant and the condenser, the aforementioned fluid can be heated by operating the heat source (refrigerant). Therefore, an actuating range of the refrigerant compressor should be considered in order to be able to set the partially provided power of the temperature-control device, in particular of the refrigerant compressor, for temperature control, in particular heating.

According to the invention, the expansion valves are used as actuators of the refrigerant circuit in order to set the end product, and therefore the total mass flow, specifically by mixing the partial mass flows. A basic idea for stabilizing the two parallel triangulation processes is application of an analogy of the lever law to the phase diagram, for example in the form of a logarithmic and/or p-V diagram. Here, the mixing ratio is preferably, as described above, set in dependence on the aforementioned enthalpy differences. This makes it possible in particular to set the second partial mass flow by an amount greater than the first partial mass flow, wherein the amount is greater than an amount by which the first enthalpy difference is greater than the second enthalpy difference.

In particular, the degrees of freedom of the, in particular evaporator-free, refrigerant circuit or of the parallel triangulation process can be particularly increased by the third expansion valve.

Further features of the invention will emerge from the claims, the figures and the description of the figures. The features and combinations of features stated above in the description and the features and combinations of features stated below in the description of the figures and/or shown alone in the figures can be used not only in the respectively specified combination, but also in other combinations or in isolation.

The invention will now be explained in more detail on the basis of a preferred exemplary embodiment and with reference to the drawings.

BRIEF DESCRIPTION OF THE DRAWINGS

In the figures, identical or functionally identical elements are provided with the same reference signs.

DETAILED DESCRIPTION OF THE DRAWINGS

Figure 1:
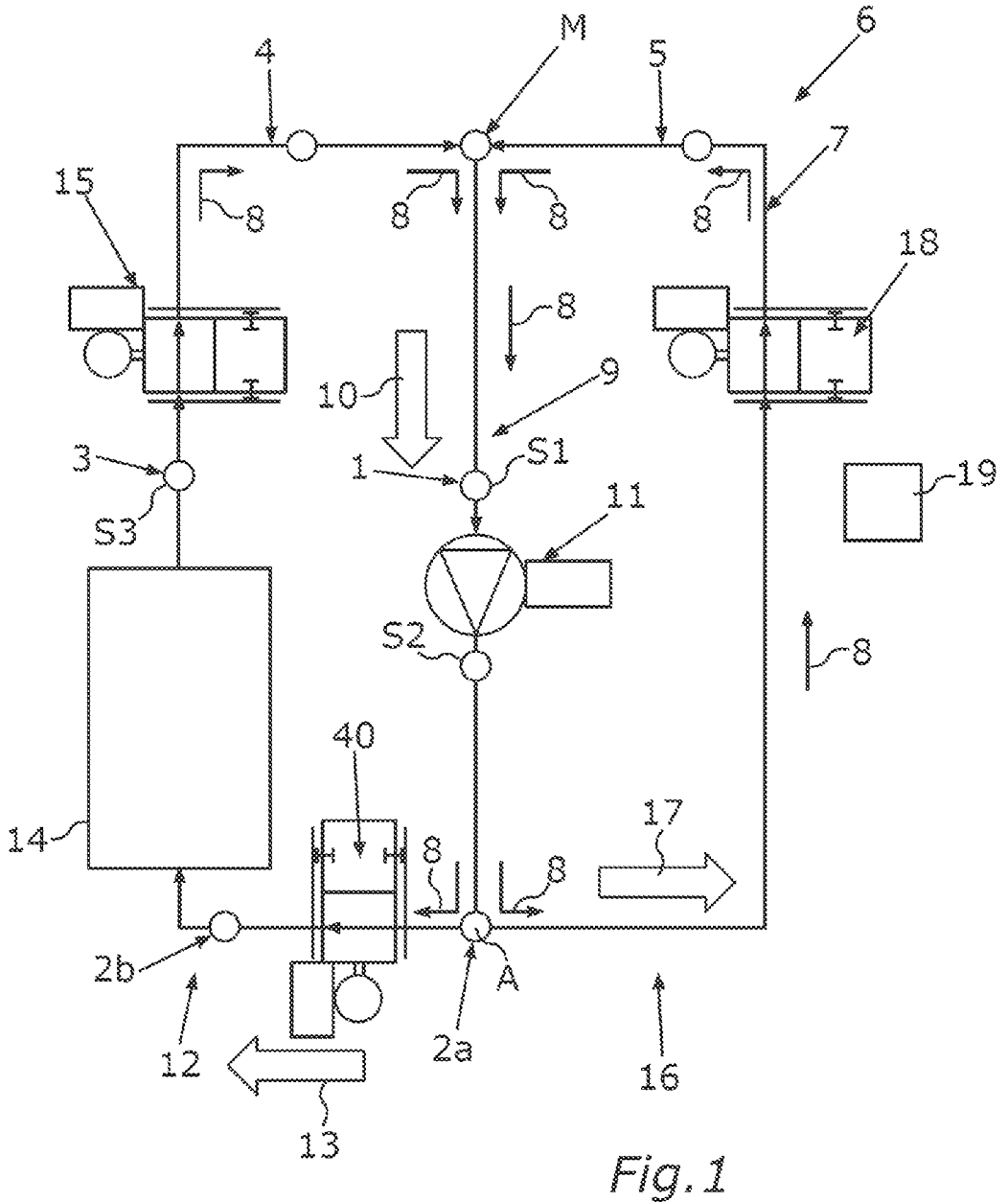
FIG. 1 shows a schematic illustration of a temperature-control device for temperature control of at least one subregion of a motor vehicle.

FIG. 1 is a schematic illustration showing a temperature-control device 6 of a motor vehicle, which is simply also referred to as a vehicle and preferably takes the form of a car, in particular a passenger car. A method for operating the temperature-control device 6 is described below by way of the figures. The aforementioned subregion of the motor vehicle can be temperature-controlled, that is to say heated or cooled, by the temperature-control device 6. In particular, the subregion can be heated. For example, the subregion is or comprises an interior, which is also referred to as a passenger cell or passenger compartment, of the motor vehicle whose body, which is designed for example as a self-supporting body, forms or delimits the interior. It is thus possible for example for the interior to be temperature-controlled, in particular heated, by the temperature-control device 6. For this purpose, the temperature-control device has a refrigerant circuit 7 through which a refrigerant can flow and which, in the method and thus during operation of the temperature-control device 6, which is operated during the operation according to the method, has the refrigerant flowing through it, in particular along a flow direction illustrated in FIG. 1 by arrows 8.

The refrigerant circuit 7 has a compressor line 9 through which a total mass flow of the refrigerant flows, wherein the total mass flow is illustrated by an arrow 10. In the compressor line 9 there is arranged a refrigerant compressor 11 by means of which the refrigerant is conveyed and compressed during the operation and thus in the method. The refrigerant circuit 7 has a condenser line 12 which branches off from the compressor line 9 and through which a first partial mass flow of the refrigerant thus flows. The first partial mass flow is illustrated by an arrow 13. The first partial mass flow is a first part of the total mass flow (arrow 10). In the condenser line 12 there is arranged a condenser 14 by means of which the first partial mass flow, and therefore the refrigerant flowing through the condenser line 12, is condensed, and therefore liquefied. Also arranged in the condenser line 12 downstream of the condenser 14 is a first expansion valve 15 by means of which the first partial mass flow can be set. In other words, the condenser 14 is arranged in the condenser line 12 upstream of the first expansion valve 15. In addition, the first partial mass flow, and therefore the refrigerant flowing through the condenser line 12, is expanded by the expansion valve 15.

The refrigerant circuit 7 also has a bypass line 16 which branches off from the compressor line 9 and through which a second partial mass flow of the refrigerant thus flows, which bypass line is fluidically connected parallel to the condenser line 12. The second partial mass flow of the refrigerant is illustrated by an arrow 17. In addition, the second partial mass flow is a second part of the total mass flow, wherein the partial mass flows in total give the total mass flow. In the bypass line 16 there is arranged a second expansion valve 18 which is provided in addition to the expansion valve 15 and by means of which the second partial mass flow can be set. In addition, the second partial mass flow, and therefore the refrigerant flowing through the bypass line 16, is expanded by the expansion valve 18. Preferably, there is provision that, in the method, evaporation of the refrigerant by a compressor is dispensed with in the compressor line 9, in the condenser line 12 and in the bypass line 16. The compressor line 9, the condenser line 12 and the bypass line 16 are particularly also referred to as lines. In the exemplary embodiment shown in the figures, the lines are free from an evaporator for the targeted evaporation of the refrigerant.

Arranged in the condenser line 12 upstream of the condenser 14 is a third expansion valve 40 by means of which the first partial mass flow can be set and is expanded. In other words, the first partial mass flow, and therefore the refrigerant flowing through the condenser line 12, is expanded by the third expansion valve 40.

The refrigerant circuit 7 has a, in particular precisely one, mixing point M at which the condenser line 12 and the bypass line 16, which are also referred to in summary as partial lines, are brought together, with the result that the partial mass flows are brought together and thus mixed with one another at the mixing point M. The partial mass flows thus give or form the total mass flow which flows, in particular at the mixing point M, into the compressor line 9 and subsequently through the compressor line 9 and in so doing in particular through the refrigerant compressor 11.

A first pressure and a first temperature of the refrigerant, in particular of the total mass flow, in the compressor line 9 upstream of the refrigerant compressor 11 and downstream of the mixing point M are determined by an electronic computing device 19 which is particularly schematically illustrated in FIG. 1. In the exemplary embodiment shown in FIG. 1, a first sensor device S1 is provided by means of which the first pressure prevailing in the compressor line 9 upstream of the refrigerant compressor 11 and downstream of the mixing point M and the first temperature prevailing in the compressor line 9 upstream of the refrigerant compressor 11 and downstream of the mixing point M are measured. The sensor device S1 provides for example a first signal which characterizes the first temperature and the first pressure and which is received by the electronic computing device 19, as a result of which the electronic computing device 19 determines the first temperature and the first pressure. In FIG. 1, a first point, which is also referred to as first location, is designated by 1. The first point 1 is arranged in the compressor line 9 downstream of the mixing point M and upstream of the refrigerant compressor 11, wherein for example the sensor device S1 measures the first pressure and the first temperature in or at the first point 1. In other words, for example the first pressure and the first temperature of the refrigerant prevail in the compressor line 9 at the point 1.

In the method, a second pressure and a second temperature of the refrigerant downstream of the refrigerant compressor 11, upstream of the condenser 14 and upstream of the expansion valves 15 and 18, and in particular of the third expansion valve 40, are determined by the electronic computing device 19. In the exemplary embodiment shown in FIG. 1, a second sensor device S2 is provided by means of which the second pressure of the refrigerant prevailing downstream of the refrigerant compressor 11, upstream of the condenser 14 and upstream of the expansion valves 15 and 18, and in particular 40, and the second temperature of the refrigerant prevailing downstream of the refrigerant compressor 11, upstream of the condenser 14 and upstream of the expansion valves 15 and 18, and in particular 40, are detected. The sensor device S2 provides for example a second signal which characterizes the second temperature and the second pressure. For example, the electronic computing device 19 receives the second signal, as a result of which the electronic computing device 19 determines the second pressure and the second temperature. In FIG. 1, a second point is designated by 2a, wherein the second point 2a is also referred to as second location. It can be seen that the first point 1 is arranged downstream of the mixing point M and upstream of the refrigerant compressor 11 in the compressor line 9. The second point 2a is arranged downstream of the refrigerant compressor 11, upstream of the condenser 14 and upstream of the expansion valves 15, 18, 40, wherein for example the second point 2a is arranged at the branch-off point A or can coincide with the branch-off point A. For example, the second pressure and the second temperature prevail at or in the second point 2a, wherein for example the second sensor device S2 measures the second pressure and the second temperature in or at the second point 2a.

A third pressure and a third temperature of the refrigerant, in particular of the first partial mass flow, in the condenser line 12 downstream of the condenser 14 and upstream of the first expansion valve 15, which, in the exemplary embodiment shown in FIG. 1, is arranged in the condenser line 12 downstream of the condenser 14 and upstream of the mixing point M, are determined by the electronic computing device 19. In the exemplary embodiment shown in FIG. 1, a third sensor device S3 is provided by means of which the third pressure of the refrigerant prevailing in the condenser line 12 downstream of the condenser 14 and upstream of the first expansion valve 15 and the third temperature of the refrigerant prevailing in the condenser line 12 downstream of the condenser 14 and upstream of the expansion valve 15 are detected. For example, the third sensor device S3 provides a third signal which characterizes the third temperature and the third pressure. The electronic computing device 19 receives for example the third signal, as a result of which the electronic computing device 19 determines the third temperature and the third pressure.

The expansion valves 15 and 18, and in particular 40, are actuated in dependence on the determined temperatures and in dependence on the determined pressures by the electronic computing device 19, as a result of which the partial mass flows are set in dependence on the determined temperatures and in dependence on the determined pressures. In this way, a mixing ratio is also set according to which the partial mass flows are mixed with one another, resulting in the total mass flow. In particular, the mixing ratio is or describes a quotient, which is also referred to as mixing quotient, wherein the mixing quotient has for example the first partial mass flow in its numerator, and wherein the mixing quotient has for example the second partial mass flow in its denominator. The first partial mass flow is designated for example by m1, and the second partial mass flow is designated for example by m2. The mixing ratio is designated for example by Φ. The following thus holds for example: Φ=m1/m2

For example, a first flow cross section, through which the first partial mass flow can flow, of the first expansion valve 15 can be set, that is to say varied, by actuating the expansion valve 15. For example, the expansion valve 15 has a first, in particular electrically operable, actuator by means of which the first flow cross section can be set. For example, the expansion valve 18 has a second flow cross section through which the second partial mass flow can flow and which can be set, that is to say varied, by actuating the expansion valve 18. For example, the expansion valve 18 has an in particular electrically operable, second actuator by means of which the second flow cross section can be set. The electronic computing device 19 controls for example the actuators in dependence on the determined pressures and in dependence on the determined temperatures in order thereby to set the flow cross sections and consequently the partial mass flows and thus the mixing ratio Φ.

In FIG. 1, a third point is designated by 3, wherein the third point 3 is also referred to as third location. It can be seen that the third point 3 is arranged in the condenser line 12 downstream of the condenser 14 and upstream of the expansion valve 15. For example, the third temperature and the third pressure prevail at or in the third point 3. For example, the third sensor device S3 measures the third pressure and the third temperature at or in the third point 3. Furthermore, in FIG. 1, a fourth point is designated by 4, wherein the fourth point is also referred to as fourth location or is a fourth location. It can be seen that the fourth location, and therefore the fourth point 4, is arranged in the condenser line 12 and here downstream of the expansion valve 15 and upstream of the mixing point M. Furthermore, in FIG. 1, a fifth point is designated by 5, wherein the fifth point 5 is also referred to as fifth location or is formed as fifth location. It can be seen that the fifth point 5 is arranged in the bypass line 16 downstream of the expansion valve 18 and upstream of the mixing point M. Furthermore, a sixth point is designated by 2b, wherein the sixth point 2b is also referred to as sixth location. It can be seen that the sixth point 2b is arranged downstream of the refrigerant compressor 11, upstream of the condenser 14 and upstream of the first and the second expansion valve 15, 18 and downstream of the third expansion valve 40, wherein for example the sixth point 2b is arranged for example in the condenser line 12. For example, the pressure at the sixth point 2b corresponds at least substantially to the pressure at the third sensor device S3.

The third expansion valve 40 is actuated in dependence on the determined third pressure. As a result, the pressure of the refrigerant flowing through the condenser line 12 at the sixth point 2b can be set, in particular in a targeted manner, for example can be reduced with respect to the pressure at the second point 2a, by the third expansion valve 40.

For example, a flow cross section, through which the first partial mass flow can flow, of the third expansion valve 40 can be set, that is to say varied, by actuating the third expansion valve 40. For example, the third expansion valve 40 has a third, in particular electrically, operable actuator by means of which the flow cross section of the third expansion valve 40 can be set.

Figure 2:
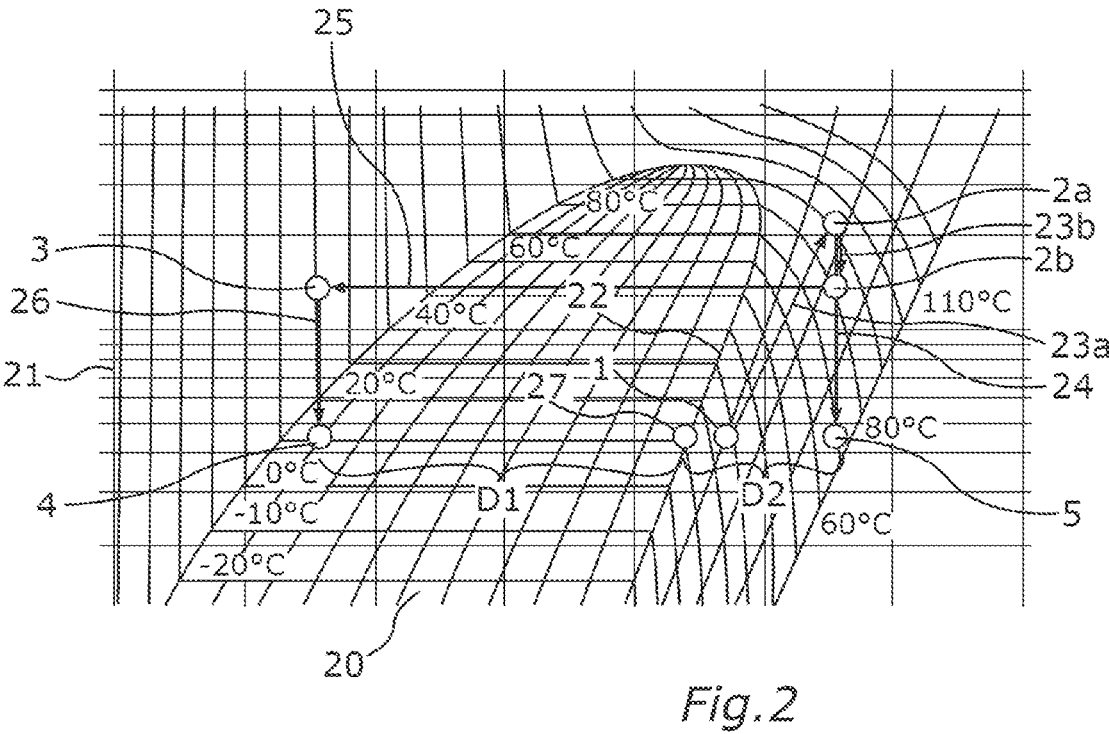
FIG. 2 shows a phase diagram of a refrigerant which flows through a refrigerant circuit of the temperature-control device in a method for operating the temperature-control device.

FIG. 2 shows a phase diagram of the refrigerant, for example in the form of R1234yf. As customary, the, in particular specific, enthalpy of the refrigerant, in particular in kilojoule per kilogram, is plotted or indicated on the abscissa 20 of the phase diagram. As customary, the pressure of the refrigerant, in particular in bar, is plotted or indicated, for example logarithmically, on the ordinate 21 of the phase diagram. The dew line of the refrigerant is designated by 22 in the phase diagram. The points 1, 2a, 2b, 3, 4 and 5 are entered in the phase diagram, with the result that the respective enthalpy of the refrigerant in the points 1, 2a, 2b, 3, 4 and 5 can be seen from the phase diagram shown in FIG. 2. In particular, it can be seen that the enthalpy of the refrigerant is identical in the points 1, 4 and 5, and the enthalpy of the refrigerant is identical in the points 2b and 3. In FIG. 2, an arrow 23a illustrates a change of state of the refrigerant from the point 1 and the point 2a, and an arrow 23b illustrates a change of state of the refrigerant from the point 2a and the point 2b. An arrow 24 illustrates a change of state of the refrigerant from the point 2b to the point 5. An arrow 25 illustrates a change of state of the refrigerant from the point 2b to the point 3, and an arrow 26 illustrates a change of state of the refrigerant from the point 3 to the point 4. What is to be understood by the respective change of state is a respective change of the thermodynamic state of the refrigerant. It can be seen that a first thermodynamic cyclic process, which takes the form of a first triangulation process, proceeds via the points 1, 2a, 2b, 3 and 4, and therefore via the compressor line 9 and the condenser line 12, and a second thermodynamic cyclic process, which takes the form of a second triangulation process, proceeds via the points 1, 2a, 2b and 5, and therefore via the compressor line 9 and the bypass line 16. The triangulation processes, which are also simply referred to as processes, are parallel, wherein none of the triangulation processes is closed. It is desirable that, with respect to the phase diagram shown in FIG. 2, the point 1 comes to lie stably to the right of the dew line 22. In other words, it is desirable that the partial flows and thus the mixing ratio are set by the expansion valves 15 and 18, and in particular 40, in such a way that, with respect to the phase diagram shown in FIG. 2, the enthalpy of the refrigerant at or in the point 1 lies safely or stably to the right of the dew line 22. This can ensure that the total mass flow is at least predominantly, in particular exclusively, superheated steam. In other words, a situation can thus be avoided in which wet steam or a liquid flows through the refrigerant compressor 11, which could lead to damage to the refrigerant compressor 11. Such an operation of the temperature-control device 6 in which, with respect to the phase diagram shown in FIG. 2, the enthalpy of the refrigerant compressor at or in the point 1 lies safely to the right of the dew line 22 is also referred to as stabilization.

It can be seen from FIG. 2 that the refrigerant has a first enthalpy at or in the first point 1, a second enthalpy at or in the second point 2a, a third enthalpy at or in the point 3, a fourth enthalpy at or in the fourth point, a fifth enthalpy at or in the fifth point and a sixth enthalpy at or in the sixth point. The fourth enthalpy corresponds to the third enthalpy, and the fifth enthalpy corresponds to the second enthalpy. The sixth enthalpy corresponds to the second enthalpy. In addition, for example the refrigerant has the same pressure, in particular the same first pressure, in or at the points 1, 4 and 5. In FIG. 2, a seventh point 27 illustrates the enthalpy of the refrigerant belonging to the first pressure and lying on the dew line 22 of the refrigerant. The enthalpy of the refrigerant belonging to the first pressure and lying on the dew line 22 of the refrigerant and illustrated by the seventh point 27 is also referred to as dew line enthalpy.

In FIG. 2, a first enthalpy difference is designated by D1, and a second enthalpy difference is designated by D2. The first enthalpy difference D1 is the absolute magnitude of a first difference between the enthalpy of the refrigerant in the point 3 and the enthalpy of the refrigerant belonging to the first pressure and lying on the dew line 22. In other words, the first enthalpy difference D1 is the absolute magnitude of a first difference between the third or fourth enthalpy and the dew line enthalpy. The second enthalpy difference D2 is the absolute magnitude of a second difference between the enthalpy of the refrigerant in the point 2 and the enthalpy of the refrigerant belonging to the first pressure and lying on the dew line 22 of the refrigerant. In other words, the second enthalpy difference D2 is the absolute magnitude of a second difference between the second or fifth enthalpy and the dew line enthalpy. The enthalpy of the refrigerant in the point 4 corresponds to the enthalpy of the refrigerant in the point 3, with the result that the enthalpy of the refrigerant in the point 3 and in the point 4 is also designated as h3. The enthalpy of the refrigerant in the point 5 corresponds to the enthalpy of the refrigerant in the point 2, with the result that the enthalpy of the refrigerant in the point 5 is also designated as h2. The enthalpy of the refrigerant illustrated by the point 27 and belonging to the first pressure and lying on the dew line 22 is also designated by ht.

As shown in FIG. 2, the pressure of the refrigerant at the second point 2a can be compressed with respect to the first point 1 by the refrigerant compressor 11. The pressure of the refrigerant at the sixth point 2b can be reduced with respect to the second point 2a, in particular by expansion, by the third expansion valve 40. The pressure of the refrigerant at the third point 3 preferably corresponds to the pressure of the refrigerant at the sixth point 2b. This means that the pressure of the refrigerant flowing through the condenser corresponds to the pressure at the sixth point 2b, which is less than the pressure of the refrigerant at the second point 2a. The pressure of the refrigerant flowing through the condenser line 12 upstream of the condenser 14, in particular at the sixth point 2b, can thus be freely set by the third expansion valve 40, in particular with respect to the pressure in the compressor line 9, in particular the pressure at the second point 2a. As a result, for example instead of the refrigerant being applied by the refrigerant compressor 11, in particular directly, to the pressure of the refrigerant at the sixth point 2b, the pressure of the refrigerant at the second point 2a can be compressed to a higher pressure value and then reduced by the third expansion valve 40, in particular for the condenser 14. As a result, a compressor power of the refrigerant compressor 11 can be particularly increased or kept particularly high, whereby a heating power of the condenser 14 can be particularly increased or can be kept high. This can be achieved for example by the heating power as it were corresponding approximately to the compressor power. The particularly high heating power can thus be brought about at a particularly low temperature level.

In order then to operate the temperature-control device 6 robustly and free from damage, and therefore to be able to stabilize it, the partial mass flows and thus the mixing ratio $\Phi$ are preferably set as follows, that is to say set in such a way that the following holds:

$$\Phi = \frac{h3 - hs}{h2 - hs}$$

Here, hs is given by:

$$hs = ht + hr$$

hr is used to designate a safety enthalpy, which is also referred to as safety value, safety distance or safety and which is added to the dew line enthalpy ht in order to set the partial mass flows and thus the mixing ratio $\Phi$ in such a way that the enthalpy of the refrigerant in the point 1 comes to lie safely to the right of the dew line 22 in the phase diagram shown in FIG. 2. It can thus be seen that the partial mass flows are set by actuating the expansion valves 15, 18 and 40 in such a way that the mixing ratio of the second partial mass flow to the first partial mass flow is greater than a ratio of the first enthalpy difference D1 to the second enthalpy difference D2. Therefore, the partial mass flows m1, m2 are set by actuating the expansion valves 15, 18 and 40 in such a way that the following holds:

$$\frac{m2}{m1} > \frac{D1}{D2}$$

Figure 3:
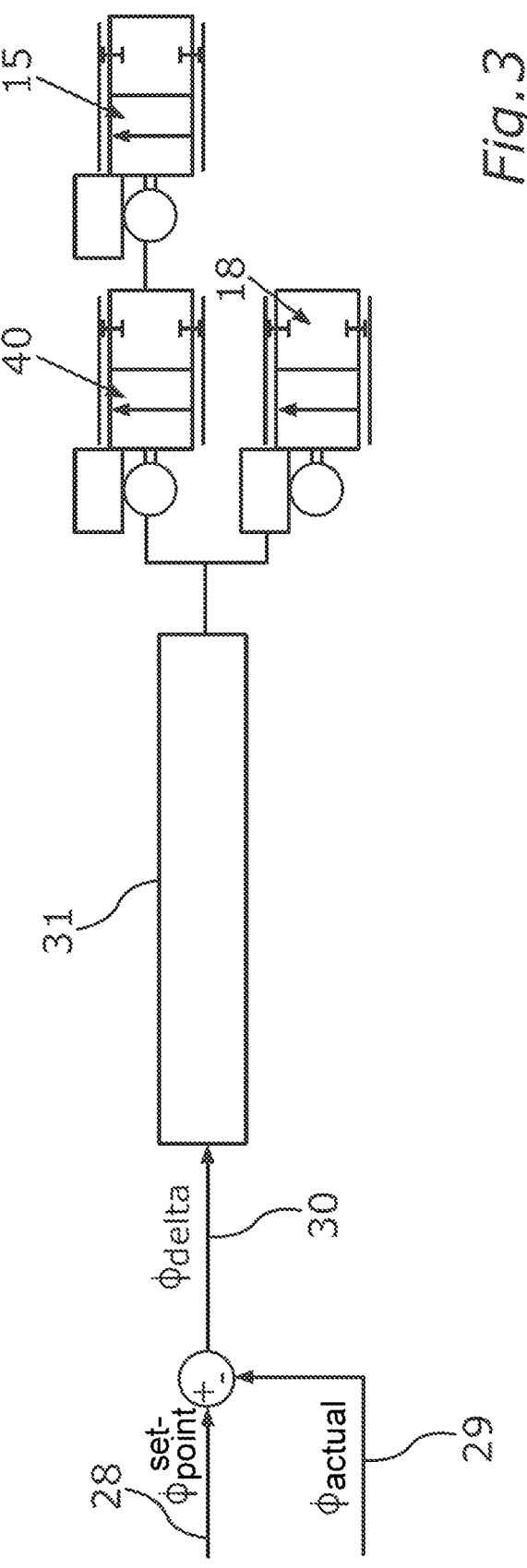
FIG. 3 shows a flow diagram for illustrating the method for operating the temperature-control device.

FIG. 3 shows a flow diagram for illustrating the method. An arrow 28 illustrates a setpoint value of the mixing ratio, wherein the setpoint value is determined or predetermined in particular in such a way that the setpoint value of the mixing ratio of the second partial mass flow and of the first partial mass flow is greater than the ratio of the first enthalpy difference D1 to the second enthalpy difference D2. An actual value of the mixing ratio is illustrated by an arrow 29, wherein the actual value is for example also designated as (actual. The actual value Φ actual is given for example by:

$$\Phi_{actual} = \frac{h3 - h1}{h2 - h1}$$

Here, h3 designates the third or fourth enthalpy, h2 designates the second enthalpy and h1 designates the first enthalpy. The first enthalpy h1 can be calculated from the first pressure and the first temperature, in particular by the electronic computing device 19, the second enthalpy h2 can be calculated from the second pressure and the second temperature, and the third enthalpy h3 can be calculated from the third pressure and the third temperature. The setpoint value of the mixing ratio is for example also designated by Φsetpoint. The setpoint value Φsetpoint is for example, as explained above, predetermined or calculated in the following way:

$$\Phi_{setpoint} = \frac{h3 - hs}{h2 - hs}$$

The following holds here:

$$hs = ht + hr$$

For example, a difference between the setpoint value Φsetpoint and the actual value Φactual is formed. This results for example in a difference Φdelta, also referred to as control deviation, which is illustrated by an arrow 30 and fed to a block 31. The block 31 illustrates for example a conversion of the setpoint value into the actuation of the expansion valves 15, 18 and 40. In other words, for example, the control difference is regulated by the block 31, with the result that the block 31 for example illustrates a controller which is realized by the electronic computing device 19. In particular, the electronic computing device 19 actuates the expansion valves 15, 18 and 40 in such a way that the difference Φdelta is at least reduced or canceled.

The method can ensure that the refrigerant compressor 11 is charged with purely gaseous fluid, and therefore that the total mass flow is formed, in particular exclusively, by a gaseous fluid or is formed as a gaseous fluid.

Figure 4:
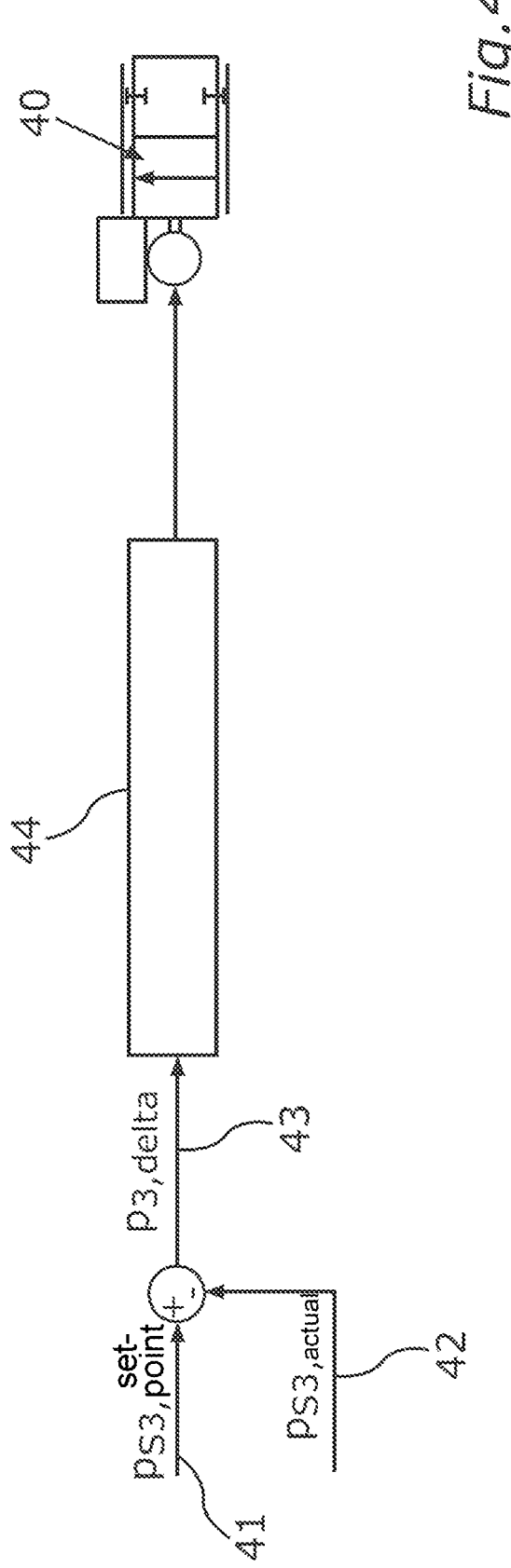
FIG. 4 shows a flow diagram for illustrating a pressure regulation of the method for operating the temperature-control device.

FIG. 4 shows a flow diagram for illustrating a control loop of the method. An arrow 41 illustrates a setpoint value of the pressure of the refrigerant at the third point 3, wherein the setpoint value is for example also designated $p_{s3,setpoint}$. In particular, the setpoint value illustrated by the arrow 41 is a setpoint value of the pressure detected by the third sensor device S3. An actual value of the pressure of the refrigerant at the third point 3 is illustrated by an arrow 42, wherein the actual value is for example also designated as $p_{s3,actual}$. In particular, the actual value illustrated by the arrow 42 is the pressure detected by the third sensor device S3.

For example, a difference between the setpoint value $p_{s3,setpoint}$ and the actual value $p_{s3,actual}$ is formed. This results for example in a difference $p_{3,delta}$, also referred to as control deviation, which is illustrated by an arrow 43 and is fed to a block 44. The block 44 illustrates for example a conversion of the setpoint value $p_{s3,setpoint}$ into the actuation of the third expansion valve 40. In other words, for example, the control difference is regulated by the block 44, with the result that the block 44 for example illustrates a controller which is realized by the electronic computing device 19. In particular, the electronic computing device 19 actuates the third expansion valve 40 in such a way that the difference $p_{3,delta}$ is at least reduced or canceled. As a result, the third expansion valve 40 can be actuated in dependence on the determined third pressure, in particular in dependence on the setpoint value $p_{s3,setpoint}$ and the actual value $p_{s3,actual}$, in particular to set, or to control, the third pressure.

Figure 5:
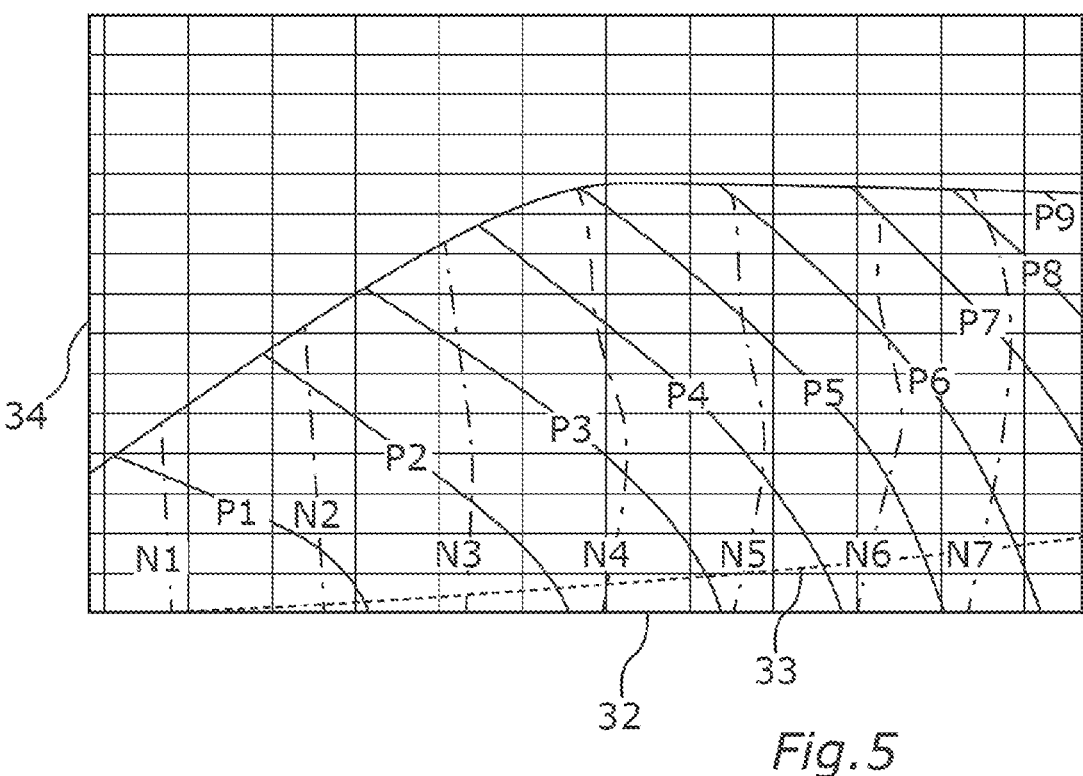
FIG. 5 shows a schematic illustration of a characteristic map of a compressor of the temperature-control device.
Figure 6:
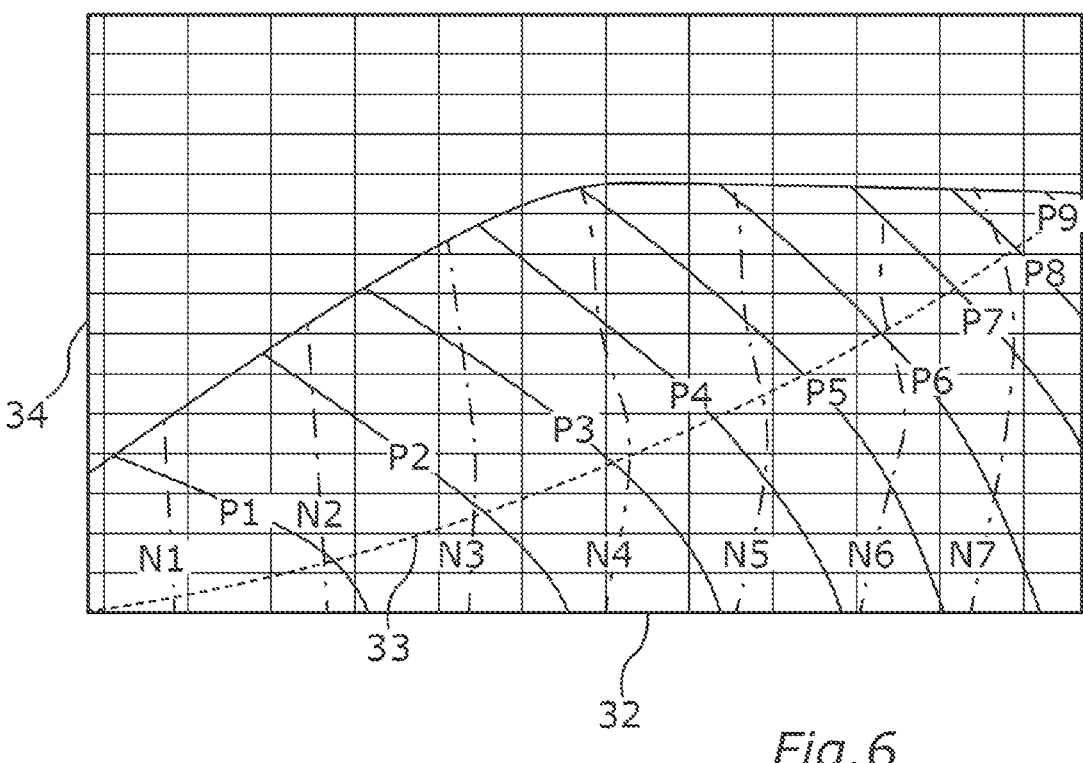
FIG. 6 shows a further schematic illustration of the characteristic map.

The method is also suitable for a power setting of the temperature-control device 6, in particular of the refrigerant compressor 11. By virtue of the fact that, at least while the method is carried out, the refrigerant compressor 11 in the temperature-control device 6 represents the only heat source in order to temperature-control, in particular to heat, the subregion, a setting of a power for temperature-control, in particular heating, of the heating region can cause problems which can now, however, be avoided by the method. The basis for this is a characteristic map, also referred to as a compressor characteristic map, which is typical for the refrigerant compressor 11 and illustrated for example in FIGS. 5 and 6. For example, a volumetric flow through the refrigerant compressor 11 (compressor) is plotted on the abscissa 32 of the characteristic map. Illustrated by way of example in FIGS. 5 and 6 are isolines P1, P2, etc. for an in particular electrical power of the compressor, and isolines N1, N2, etc. for a rotational speed of the compressor. Also shown by way of example is a pressure loss curve 33 which results if the expansion valves 15 and 18, and in particular 40, or their cross sections are completely opened, and therefore set to a respective maximum value. If it is then desired for example to set a certain power point of the compressor, wherein the power point lies for example on the isoline P6, two degrees of freedom are then available. A first of the degrees of freedom is the rotational speed of the compressor, also referred to as compressor rotational speed. The second degree of freedom is the pressure loss curve which results from losses which are mainly caused by the expansion valves 15 and 18, and in particular 40. The smaller the respective flow cross section of the respective expansion valve 15, 18, and in particular 40, the higher a resistance against which the compressor must operate and the higher the losses. Whereas, for example according to FIG. 5, the flow cross sections are set to a maximum, according to FIG. 6 the flow cross sections are set to be smaller than according to FIG. 5, with the result that the losses are greater, which can be seen from the pressure loss curve 33. It is thus possible, on the basis of the characteristic map and on the basis of the degrees of freedom, for the pressure ratio plotted on the ordinate 34 of the characteristic map and the power of the compressor to be set, at least arbitrarily, within limits. By increasing the pressure losses, and therefore by reducing the flow cross sections, the power of the compressor is increased. By increasing the flow cross sections, the power of the compressor is reduced. It is then possible to vary the flow cross sections in order to vary the power of the compressor and thus the power for temperature control of the subregion, although, in spite of varying the flow cross sections, a ratio of the flow cross sections to one another and thus the mixing ratio remains the same. It is thus possible with the same mixing ratio to selectively set a first power of the compressor or a second power of the compressor, which is greater or less than the first power, with the result that for example the first power of the compressor is set in a first operating state and the second power of the compressor is set in a second operating state, with it being the case, however, that the mixing ratio in the first operating state corresponds to the mixing ratio in the second operating state. This is possible in particular in such a way that the flow cross sections are greater in the first operating state than in the second operating state, but the same ratio of the flow cross sections to one another is set in the first operating state and in the second operating state.

Figure 7:
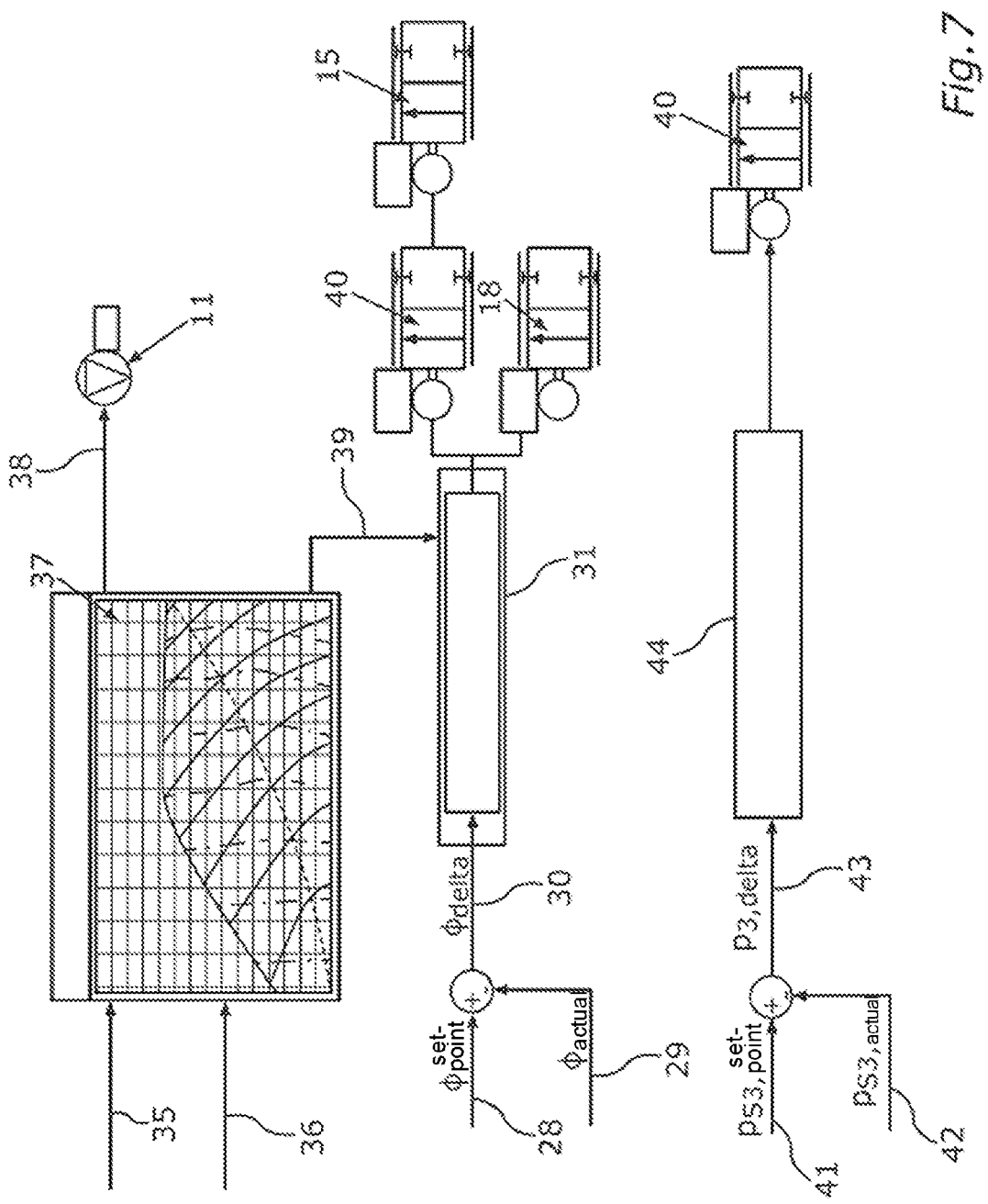
FIG. 7 shows a further flow diagram for further illustration of the method.

FIG. 7 illustrates a further diagram for further illustration of the method. An arrow 35 illustrates a setpoint value of the power of the compressor, and an arrow 36 illustrates a setpoint value of the pressure ratio or a pressure to which the refrigerant is to be compressed by the compressor. On the basis of the compressor characteristic map designated by 37 in FIG. 7, the rotational speed of the compressor illustrated by an arrow 38 results from the setpoint value of the power and from the setpoint value of the pressure or pressure ratio. An arrow 39 illustrates for example the pressure loss curve of a system characteristic in the characteristic map or the system characteristic, wherein, on the basis of the pressure loss curve or the system characteristic, as described, the powers for temperature control, in particular heating, of the subregion are varied, but, for example, the mixing ratio can be kept the same or set in such a way that the first enthalpy comes to lie safely to the right of the dew line 22 in the phase diagram.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 First point
2a Second point
2b Sixth point
3 Third point
4 Fourth point
5 Fifth point
6 Temperature-control device
7 Refrigerant circuit
8 Arrow
9 Compressor line

10 Arrow
11 Refrigerant compressor
12 Condenser line
13 Arrow
14 Condenser
15 First expansion valve
16 Bypass line
17 Arrow
18 Second expansion valve
19 Electronic computing device
20 Abscissa
21 Ordinate
22 Dew line
23a Arrow
23b Arrow
24 Arrow
25 Arrow
26 Arrow
27 Point
28 Arrow
29 Arrow
30 Arrow
31 Block
32 Abscissa
33 Pressure loss curve
34 Ordinate
35 Arrow
36 Arrow
37 Compressor characteristic map
38 Arrow
39 Arrow
40 Third expansion valve
41 Arrow
42 Arrow
43 Arrow
44 Block
A Branch-off point
D1 First enthalpy difference
D2 Second enthalpy difference
M Mixing point
S1 First sensor device
S2 Second sensor device
S3 Third sensor device

What is claimed is:

1. A method for operating a temperature-control device for temperature control of at least one subregion of a motor vehicle, wherein the temperature-control device comprises a refrigerant circuit through which a refrigerant flows, wherein the refrigerant circuit comprises:

a compressor line through which a total mass flow of the refrigerant flows and in which there is arranged a refrigerant compressor by which the refrigerant is conveyed and compressed;

a condenser line which branches off from the compressor line and through which a first partial mass flow of the refrigerant flows, in which condenser line there are arranged a first expansion valve configured to set and expand the first partial mass flow, and a condenser configured to condense the first partial mass flow, wherein the condenser is arranged in the condenser line upstream of the first expansion valve;

a bypass line connected parallel to the condenser line and which branches off from the compressor line and through which a second partial mass flow of the refrigerant flows, in which bypass line there is arranged a second expansion valve configured to set and expand the second partial mass flow; and a third expansion valve which is arranged in the condenser line upstream of the condenser and which is configured to set and expand the first partial mass flow;

wherein the condenser line and the bypass line are brought together at a mixing point at which the first partial mass flow and the second partial mass flow are brought together and mixed with one another to produce the total mass flow which flows into and through the compressor line;

wherein the method comprises:

determining, by an electronic controller, a first pressure and a first temperature of the refrigerant in the compressor line upstream of the refrigerant compressor and downstream of the mixing point;

determining, by the electronic controller, a second pressure and a second temperature of the refrigerant downstream of the refrigerant compressor, upstream of the condenser, and upstream of the first and the second expansion valves;

determining a third pressure and a third temperature of the refrigerant in the condenser line downstream of the condenser and upstream of the first expansion valve;

actuating the first and the second expansion valves in dependence on at least the determined first and second temperatures and at least the determined first and second pressures, as a result of which the first partial mass flow and the second partial mass flow are set in dependence on at least the determined first and second temperatures and in dependence on at least the determined first and second pressures; and actuating the third expansion valve in dependence on the determined third pressure.

2. The method according to claim 1, comprising:

setting the first partial mass flow and the second partial mass flow by actuating the first, second, and third expansion valves in such a way that the total mass flow consists of superheated steam.

3. The method according to claim 1, comprising:

calculating, by the electronic controller, a first enthalpy of the refrigerant from the first pressure and the first temperature;

calculating, by the electronic controller, a second enthalpy of the refrigerant from the second pressure and the second temperature;

calculating, by the electronic controller, a third enthalpy of the refrigerant from the third pressure and the third temperature; and actuating the first, second, and third expansion valves in dependence on the calculated first, second, and third enthalpies, as a result of which the first and second partial mass flows are set in dependence on the calculated first, second, and third enthalpies.

4. The method according to claim 1, comprising:

actuating the first, second, and third expansion valves to set the first and second partial mass flows in such a way that a mixing ratio of the second partial mass flow to the first partial mass flow is greater than a ratio of a first enthalpy difference to a second enthalpy difference, wherein:

the first enthalpy difference is an absolute magnitude of a first difference between the enthalpy of the refrigerant in the condenser line downstream of the condenser and upstream of the first expansion valve, and the enthalpy of the refrigerant belonging to the first pressure and lying on the dew line of the refrigerant; and the second enthalpy difference is an absolute magnitude of a second difference between the enthalpy of the refrigerant downstream of the refrigerant compressor, upstream of the condenser, and upstream of the first and the second expansion valves, and the enthalpy of the refrigerant belonging to the first pressure and lying on the dew line of the refrigerant.

5. The method according to claim 1, wherein the bypass line is at least one of:

free from a condenser for condensing the refrigerant;

free from an evaporator for evaporating the refrigerant; and/or free from a heat exchanger for the temperature control of the refrigerant.

6. The method according to claim 1, comprising:

dispensing evaporation of the refrigerant by an evaporator within the condenser line.

7. The method according to claim 1, comprising:

measuring the first pressure and the first temperature by a first sensor device;

measuring the second pressure and the second temperature by a second sensor device; and/or measuring the third pressure and the third temperature by a third sensor device.

8. The method according to claim 1, comprising:

calculating the first pressure and the first temperature by the electronic controller on a basis of a computing model;

calculating the second pressure and the second temperature by the electronic controller on a basis of a computing model; and/or calculating the third pressure and the third temperature by the electronic controller on a basis of a computing model.

9. The method according to claim 1, comprising:

in a first operating state, setting the first partial mass flow to a first value and the second partial mass flow to a second value by actuating the first, second, and third expansion valves; and in a second operating state, setting the first partial mass flow to a third value, which is different from the first value, and setting the second partial mass flow to a fourth value, which is different from the second value, by actuating the first, second, and third expansion valves, wherein a first ratio of the first value to the second value corresponds to a second ratio of the third value to the fourth value, as a result of which, in the first operating state, a first power of the refrigerant compressor is set and, in the second operating state, a second power of the refrigerant compressor, which is different from the first power, is set.

10. A temperature-control device for temperature control of at least one subregion of a motor vehicle, wherein the temperature-control device comprises:

a refrigerant circuit through which a refrigerant flows, wherein the refrigerant circuit comprises:

a compressor line through which a total mass flow of the refrigerant flows and in which there is arranged a refrigerant compressor by which the refrigerant is conveyed and compressed;

a condenser line which branches off from the compressor line and through which a first partial mass flow of the refrigerant flows, in which condenser line there are arranged a first expansion valve configured to set and expand the first partial mass flow, and a condenser configured to condense the first partial mass flow, wherein the condenser is arranged in the condenser line upstream of the first expansion valve;

a bypass line connected parallel to the condenser line and which branches off from the compressor line and through which a second partial mass flow of the refrigerant flows, in which bypass line there is arranged a second expansion valve configured to set and expand the second partial mass flow; and a third expansion valve which is arranged in the condenser line upstream of the condenser and which is configured to set and expand the first partial mass flow, wherein the condenser line and the bypass line are brought together at a mixing point at which the first partial mass flow and the second partial mass flow are brought together and mixed with one another to produce the total mass flow which flows into and through the compressor line; and an electronic controller configured to:

determine a first pressure and a first temperature of the refrigerant in the compressor line upstream of the refrigerant compressor and downstream of the mixing point;

determine a second pressure and a second temperature of the refrigerant downstream of the refrigerant compressor, upstream of the condenser, and upstream of the first and the second expansion valves;

determine a third pressure and a third temperature of the refrigerant in the condenser line downstream of the condenser and upstream of the first expansion valve;

actuate the first and the second expansion valves in dependence on at least the determined first and second temperatures and at least the determined first and second pressures, as a result of which the first partial mass flow and the second partial mass flow are set in dependence on at least the determined first and second temperatures and in dependence on at least the determined first and second pressures; and actuate the third expansion valve in dependence on the determined third pressure.

11. The temperature-control device according to claim 10, wherein the electronic controller is configured to:

set the first partial mass flow and the second partial mass flow by actuating the first, second, and third expansion valves in such a way that the total mass flow consists of superheated steam.

12. The temperature-control device according to claim 10, wherein the electronic controller is configured to:

calculate a first enthalpy of the refrigerant from the first pressure and the first temperature;

calculate a second enthalpy of the refrigerant from the second pressure and the second temperature;

calculate a third enthalpy of the refrigerant from the third pressure and the third temperature; and actuate the first, second, and third expansion valves in dependence on the calculated first, second, and third enthalpies, as a result of which the first and second partial mass flows are set in dependence on the calculated first, second, and third enthalpies.

13. The temperature-control device according to claim 10, wherein the electronic controller is configured to:

actuate the first, second, and third expansion valves to set the first and second partial mass flows in such a way that a mixing ratio of the second partial mass flow to the first partial mass flow is greater than a ratio of a first enthalpy difference to a second enthalpy difference, wherein:

the first enthalpy difference is an absolute magnitude of a first difference between the enthalpy of the refrigerant in the condenser line downstream of the condenser and upstream of the first expansion valve, and the enthalpy of the refrigerant belonging to the first pressure and lying on the dew line of the refrigerant; and the second enthalpy difference is an absolute magnitude of a second difference between the enthalpy of the refrigerant downstream of the refrigerant compressor, upstream of the condenser, and upstream of the first and the second expansion valves, and the enthalpy of the refrigerant belonging to the first pressure and lying on the dew line of the refrigerant.

14. The temperature-control device according to claim 10, wherein the bypass line is at least one of:

free from a condenser for condensing the refrigerant;

free from an evaporator for evaporating the refrigerant; and/or free from a heat exchanger for the temperature control of the refrigerant.

15. The temperature-control device according to claim 10, comprising:

an evaporator configured to dispense evaporation of the refrigerant within the condenser line.

16. The temperature-control device according to claim 10, comprising:

a first sensor device configured to measure the first pressure and the first temperature;

a second sensor device configured to measure the second pressure and the second temperature; and/or a third sensor device configured to measure the third pressure and the third temperature.

17. The temperature-control device according to claim 10, wherein the electronic controller is configured to:

calculate the first pressure and the first temperature on a basis of a computing model;

calculate the second pressure and the second temperature on a basis of a computing model; and/or calculate the third pressure and the third temperature on a basis of a computing model.

18. The temperature-control device according to claim 10, wherein the electronic controller is configured to:

in a first operating state, set the first partial mass flow to a first value and the second partial mass flow to a second value by actuating the first, second, and third expansion valves; and in a second operating state, set the first partial mass flow to a third value, which is different from the first value, and set the second partial mass flow to a fourth value, which is different from the second value, by actuating the first, second, and third expansion valves, wherein a first ratio of the first value to the second value corresponds to a second ratio of the third value to the fourth value, as a result of which, in the first operating state, a first power of the refrigerant compressor is set and, in the second operating state, a second power of the refrigerant compressor, which is different from the first power, is set.

* * * * *